UNITED STATES PATENT OFFICE.

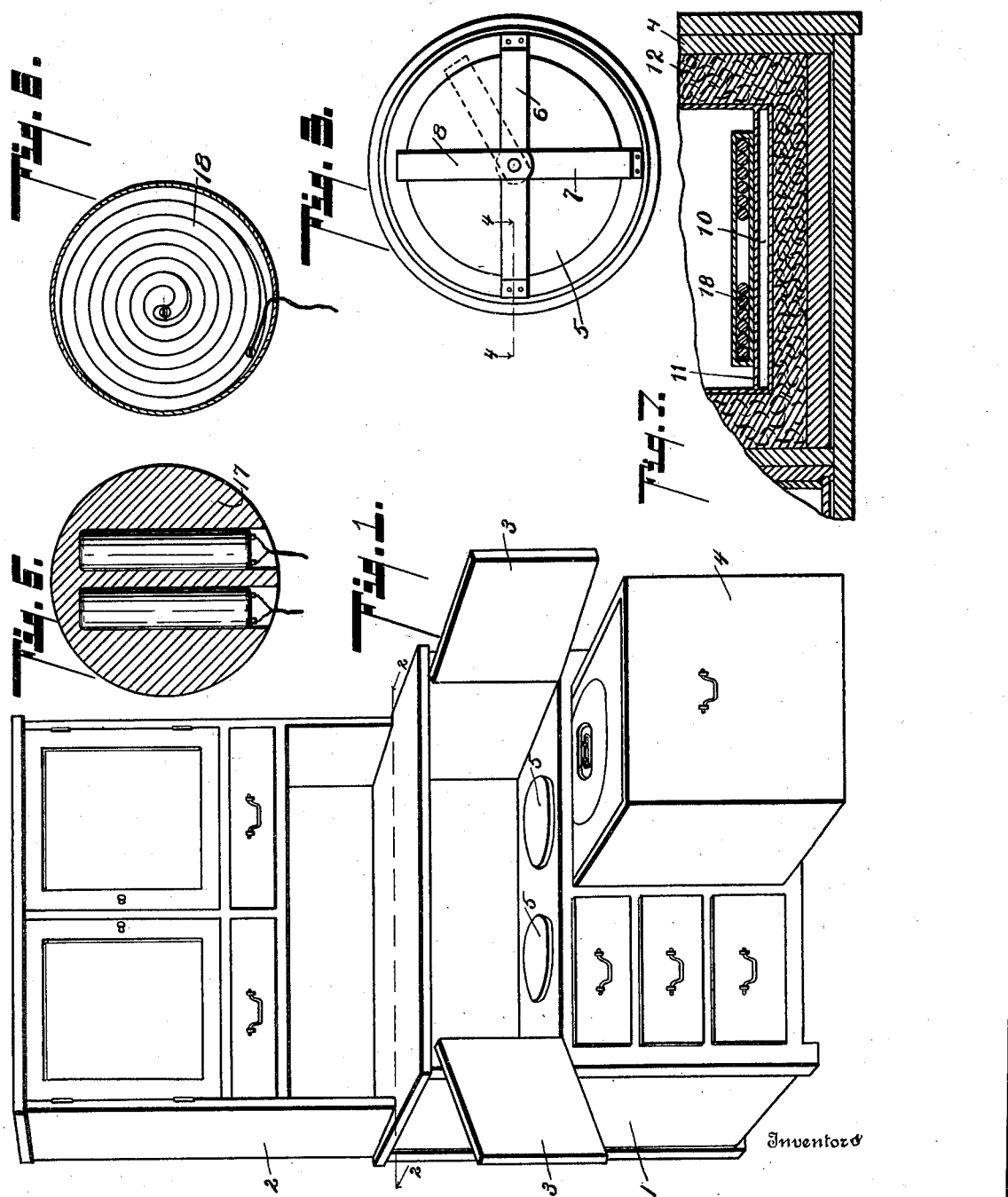

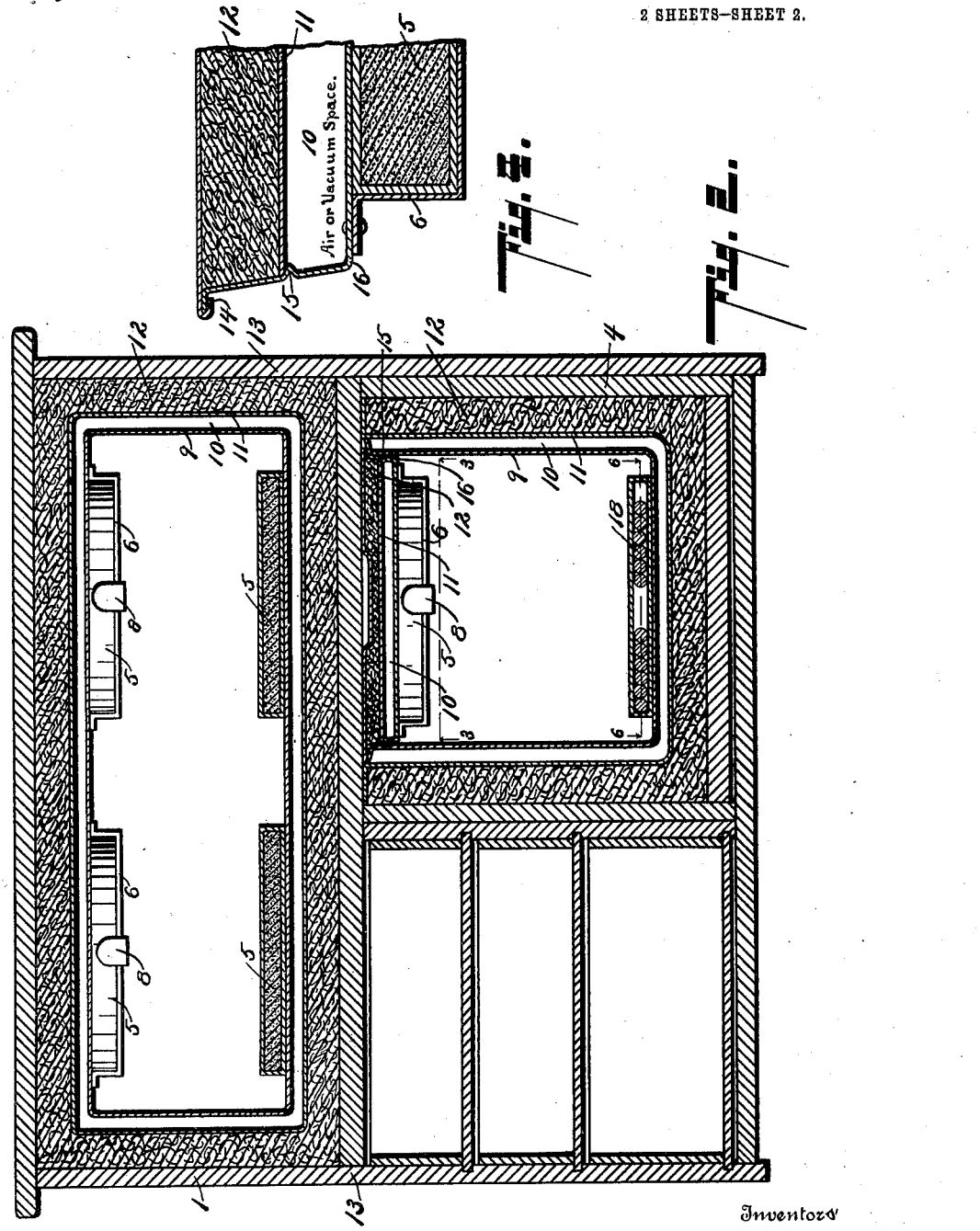

CALVIN A. LAUZON AND JOHN A. ROSE, OF GRAND RAPIDS, MICHIGAN, ASSIGNORS, BY MESNE ASSIGNMENTS, TO WM. HEAP & CO., OF MUSKEGON, MICHIGAN, A COPARTNERSHIP.

FIRELESS COOKER.

1,029,137. Specification of Letters Patent. Patented June 11, 1912.

Application filed January 29, 1909. Serial No. 474,985.

*To all whom it may concern:*

Be it known that we, CALVIN A. LAUZON and JOHN A. ROSE, citizens of the United States, residing at Grand Rapids, Michigan, have invented certain new and useful Improvements in Fireless Cookers, of which the following is a specification.

This invention relates to improvements in fireless cookers.

In the manufacture of fireless cookers, it has been found that an insulating material of woody substance or fiber, such as cork, excelsior, fibered wood, or cellular fiber of vegetable or animal origin in any form, is very desirable because it is within the range of cost permitted for such material and is very effective and light, making the cookers manufactured therefrom of reasonable and convenient weight. However, when the cooker is intended to accomplish a baking, as distinguished from a stewing or boiling action and it is consequently necessary to introduce heating bodies, or to raise the temperature by electricity, these various fibers disintegrate under the action of the higher heat and soon lose their character, and further, there is danger of ignition as well, from the intense drying and charring action which would be exerted upon the same.

The objects of this invention are: First, to provide a fireless cooker in which these desirable insulating materials can be made use of without danger of their deterioration. Second, to provide an improved and effective insulation. Third, to provide an improved construction of parts whereby a perfect closure is insured. Fourth, to provide an improved means of retaining and supporting the heating bodies within the cooker when it is desired to subject the contents thereof to a baking heat.

Further objects, and objects relating to details of construction, will definitely appear from the detailed description to follow.

We accomplish the objects of our invention by the devices and means described in the following specification.

The invention is clearly defined and pointed out in the claims.

A structure embodying the features of our invention is clearly illustrated in the accompanying drawing, forming a part of this invention, in which:

Figure 1 is a perspective view of our improved fireless cooker as adapted to and incorporated in a kitchen cabinet. Fig. 2 is a transverse vertical sectional elevation through the lower portion of the cabinet, taken on a line corresponding to line 2—2 of Fig. 1. Fig. 3 is a detail inverted plan view of our improved cover, showing the means for supporting the heater within the cooker. Fig. 4 is an enlarged detail transverse sectional view taken on line 4—4 of Fig. 3. Fig. 5 shows a view of the heating element provided with electrical heating cartridges inserted into the same. Fig. 6 is a detail sectional view of another form of electrical heater for use in the fireless cooker. Fig. 7 is a detail view of a modification.

In the drawing, the sectional views are taken looking in the direction of the little arrows at the end of the section lines, and similar numerals of reference refer to similar parts throughout the several views.

Considering the numbered parts of the drawing, we have shown our fireless cooker incorporated into a kitchen cabinet, which is provided with a base 1 in which the fireless cooker is situated, and a super-structure 2 of any usual cupboard or drawer design. The upper part of the base 1 of the cabinet is provided with one of our fireless cookers having doors 3, opening at the front, the same being especially intended for use as a baking cooker. The drawer 4 in the base constitutes another form of the cooker, which drawer, of course, could be used independent of any kitchen cabinet, the cabinet being merely a convenient place of storage for it.

An inner metallic case or receptacle 9 is provided which is suitably supported so that there is a space 10 between it and a second metallic shell 11, which space may be an air space, or the air may be exhausted therefrom so as to secure a vacuum, or partial vacuum, which greatly increases the efficiency of the cooker. Between the metallic shell 11 and the outer casing of the cooker, we interpose insulating material 12, which is preferably a prepared granular cork, although any insulating fiber could be used in this position.

Within the cooker, we provide a heat containing body 5 for storing and supplying heat which is preferably a sheet metal case filled with rock salt or some similar material, although cast iron is an available material. This is supported in the upper part of the receptacle 9 by means of a metallic loop 6, and cross loop 7 which are riveted to the top of the receptacle 9, and a swinging arm or gate 8 retains the heater body 5 in place. The heater body 5 may also be placed on the bottom of the inner receptacle 9.

In the drawer cooker 4 we make the receptacle 9 cylindrical in form, open at the top, and secure it in place by suitable flanging at the top, and connect in the same way the outer shell to the intermediate shell.

We provide a cover for this structure of peculiar construction, having beveled sides with a groove 15 around the same for supporting the intermediate plate 11 to form the chamber 10 in the cover, which may be either an air chamber or a vacuum chamber, as stated. The beveled part of the cover is flanged at the top at 14. It is secured to the top plate by suitable means. The top plate projects and completely closes the receptacle. A suitable depression is made in the top of this cover for a handle, seen in Fig. 1, so that the drawer can be moved back into the cabinet and the whole be still further insulated.

In place of the heating body 5, an electrically heated body 17, like that appearing in Fig. 5, can be made use of, which is preferably of cast metal with electric heating cartridges inserted into suitable openings therein. A cast metal heating body can be used in place of the casing filled with rock salt. Another form of electric heating body 18 is also illustrated, appearing detailed in Fig. 6.

Having thus described our improved fireless cooker, we desire to state that the structure can be greatly modified in detail without departing from our invention. We have shown how conveniently it is adapted for use in a kitchen cabinet, but, of course, it is capable of use as an entirely independent structure.

We have found that the cooker is very effective if we provide the insulating chamber 10 only at top and bottom in proximity to the heating device, as the radiation and conduction at the sides that are non-adjacent to the heating device will not be sufficient to unduly heat the insulating material 12. This form we show in Fig. 7 as a modification of the structure of the drawer appearing in Fig. 2, showing the chamber 10 in the bottom and not at the sides.

Having thus described our invention, what we claim as new and desire to secure by Letters Patent is:

1. In a fireless cooker, a suitable insulated receptacle; a removable cover; a heating body; loops secured to said cover for supporting the said heating body; and a swinging arm for locking the said heating body in place, coacting for the purpose specified.

2. In a fireless cooker, a suitable insulated receptacle; a heating body; loops secured within said receptacle for supporting said heating body; and a swinging arm for locking the said heating body in place, coacting for the purpose specified.

3. A removable cover for a fireless cooker consisting of a metal casing having a top plate and a bottom plate; a partition wall therein midway between the said plates, forming a chamber toward the interior of said cooker and a space outside of said partition; insulating material filling the space toward the outer side of the said partition; and a heating body detachably secured to the inner side of the said cover within the inner receptacle, coacting as specified.

4. In a fireless cooker, a removable cover consisting of a metal casing having tapered edges and having a compartment filled with a suitable insulating material; a heating body detachably secured to the inner side of said cover within the said receptacle, whereby the said cover and heating body are removable together, and the said heating body is rendered accessible, coacting as specified.

In witness whereof, we have hereunto set our hands and seals in the presence of two witnesses.

CALVIN A. LAUZON. [L. S.]
JOHN A. ROSE. [L. S.]

Witnesses:
GEORGE CLAPPERTON,
JULIA LYNCH.

---

Copies of this patent may be obtained for five cents each, by addressing the "Commissioner of Patents, Washington, D. C."